US005695146A

United States Patent [19]
Schmidt et al.

[11] Patent Number: 5,695,146
[45] Date of Patent: Dec. 9, 1997

[54] SAFETY BELT RESTRAINING SYSTEM WITH SECURING MECHANISM FOR MECHANICAL SENSOR

[75] Inventors: Martin Schmidt; Matthias Bäker, both of Hamburg; Ronald Jabusch, Elsmhorn, all of Germany

[73] Assignee: Autoliv Development AB, Vargarda, Sweden

[21] Appl. No.: 613,012

[22] Filed: Mar. 8, 1996

[30] Foreign Application Priority Data

Mar. 10, 1995 [DE] Germany ............... 195 08 620.1

[51] Int. Cl.$^6$ ................................. B60R 22/41
[52] U.S. Cl. ..................... 242/384.1; 242/382.1
[58] Field of Search .................. 242/382.1, 382.4, 242/384.1, 384.4; 280/805, 806, 807

[56] References Cited

U.S. PATENT DOCUMENTS

| | | | |
|---|---|---|---|
| 4,034,931 | 7/1977 | Fisher et al. | 242/382.1 |
| 4,465,245 | 8/1984 | Saikai | 242/382.1 |
| 4,509,706 | 4/1985 | Thomas | 242/384.1 |
| 5,370,333 | 12/1994 | Lortz et al. | 242/384.1 |
| 5,505,400 | 4/1996 | Boelstler et al. | 242/384.1 |

FOREIGN PATENT DOCUMENTS

| | | |
|---|---|---|
| 0456853 | 11/1991 | European Pat. Off. |
| 0529501 | 3/1993 | European Pat. Off. |
| 4128230 | 5/1992 | Germany |
| 4132876 | 4/1993 | Germany |
| 5319209 | 12/1993 | Japan |

*Primary Examiner*—John P. Darling
*Attorney, Agent, or Firm*—Robert W. Becker & Associates

[57] ABSTRACT

A control mechanism for a mechanical sensor at a safety belt reeling device of a safety restraining mechanism has a housing and a mechanical sensor pivotably connected to the housing. A locking device is connected to the housing and has a locking position for securing the mechanical sensor against pivoting and a release position for releasing the mechanical sensor. The locking device has an initial disengaged position before mounting of the housing to the vehicle and a stand-by position in which the locking device still secures the mechanical sensor. A sensing device for sensing belt removal from the safety belt reeling device is provided and cooperates with the locking device in the stand-by position such that, at a certain degree of belt removal, the sensing device moves the locking device from the locking position into the release position. A control member for controlling the locking device is provided and has an inactive position and an active position. The control member is moved from the inactive position into the active position when the housing is fastened to the vehicle. In the inactive position the locking device is forced by the control member into the initial disengaged position and, when the control member is moved into the active position, the locking device is moved into the stand-by position.

7 Claims, 4 Drawing Sheets

SAFETY BELT RESTRAINING SYSTEM WITH SECURING MECHANISM FOR MECHANICAL SENSOR

BACKGROUND OF THE INVENTION

The present invention relates to a control mechanism for a mechanical sensor, used in connection with a safety belt restraining system, at a safety belt reeling device, a tensioning device, or an air bag restraining system, wherein a locking device for securing the mechanical sensor is integrated in a housing and serves as a securing device during mounting of the device, whereby the locking device is movable from a locked position into a release position for the mechanical sensor and whereby this control movement is initiated by a control member which is activated by connecting the housing to a part of the vehicle.

A control mechanism with the aforementioned features for safety belt restraining systems is known from European Patent 0 456 853. The control mechanism, for the purpose of providing a securing device during mounting of the respective device, comprises a locking device for securing an inertia mass, serving as a mechanical sensor, which locking device can be controlled by a control member, activated by screwing the device to the vehicle, between a locking position for the inertia mass and a release position. The control member may be in the form of a sensing pin that itself, during screwing of the device to the vehicle, comes into contact with the vehicle part and is moved thereby, or in the form of a separate sensing lever which is moved by the screwing action and then acts on the control member to move it between a locking position and a release position. The known locking device thus serves exclusively the purpose of providing a securing device for mounting whereby the control action is reversible so that upon removing the corresponding device from the vehicle the securing action for mounting is again active by securing the mechanical sensor. However, when the device is screwed to the vehicle, the securing action of the mechanical sensor is completely released. This is disadvantageous because, for certain acceleration forces, the sensor can be triggered even though such a triggering action is not desired because the seat, respectively, the safety belt is not in use.

It is therefor an object of the present invention to improve a control mechanism with the aforementioned features such that the securing of the mechanical sensor is only canceled upon using the safety belt restraining device, in particular the safety belt.

SUMMARY OF THE INVENTION

A control mechanism for a mechanical sensor for a safety belt reeling device of a safety restraining mechanism of a vehicle according to the present invention is primarily characterized by:

a housing;

a mechanical sensor pivotably connected to the housing;

a locking device connected to the housing, wherein the locking device has a locking position for securing the mechanical sensor against pivoting and a release position for releasing the mechanical sensor, wherein the locking device further has an initial disengaged position before mounting of the housing to the vehicle and a stand-by position in which the locking device remains in the locking position relative to the mechanical sensors;

a sensing device for sensing belt removal from the safety belt reeling device and for cooperating with the locking device in the stand-by position such that, at a certain degree of belt removal, the sensing device moves a locking device from the locking position into the release position; and a control member for controlling the locking device, the control member having an inactive position and an active position, wherein the control member is moved from the inactive position into the active position when the housing is fastened to the vehicle, wherein in the inactive position the locking device is forced by the control member into the initial disengaged position and wherein, when the control member is moved into the active position, the locking device is moved into stand-by position.

Advantageously, the locking device is a toothed rack connected to the housing so as to be pivotable between the initial disengaged position and the stand-by position and so as to be longitudinally slidable between the locking position and the release position.

Advantageously, the toothed rack has a first end section and a second end section, wherein the first end section is pivotably connected to the housing and the second end section engages the mechanical sensor in the locking position.

Advantageously, the control member is a spring element having a first end fixedly connected to the housing and a second end for biasing the toothed rack in a direction of pivoting into the stand-by position.

Preferably, the spring element has a bent portion in an area of the housing with which the housing is connected to the vehicle.

Preferably, the sensing device comprises a drive pinion connected to a shaft of the safety belt reeling device, a bearing plate movably connected to the housing and a transmission pinion connected to the bearing plate, wherein the drive pinion meshes with the transmission pinion, wherein the certain degree of belt removal is defined by a certain number revolutions of the drive pinion, and wherein, when the certain number of revolutions has been reached, the transmission pinion engages the toothed rack to thereby transmit the rotation of the shaft onto the toothed rack.

Preferably, the toothed rack comprises means for arresting the toothed rack in the locking position and in the release position.

The invention is thus in particular concerned with the deactivation of a mechanical sensor as a function of use of the vehicle seat, respectively, the safety belt, in order to avoid an unnecessary release of the tensioning device or of the air bag restraining system. This deactivation is achieved with a belt sensing device and is combined with a securing system, respectively, securing action for mounting.

The invention thus suggests in its basic idea that the control member moves the locking device from its initial disengaged position into a stand-by position while maintaining the locking position for the mechanical sensor and that the locking device in its stand-by position, only when the safety belt is being used as a function of removal of the safety belt from the belt shaft, is moved by a separate safety belt sensing device between its locking position and release position for the mechanical sensor. The invention has the advantage that, upon screwing the housing to the vehicle, the securing action for mounting with the locking device that secures the mechanical sensor has not yet been canceled, but that the actual use of the safety belt restraining device is required in order to cancel the respective securing action performed by the locking device on the mechanical sensor.

This ensures in an advantageous manner, even after mounting, that when the safety belt restraining device is not in use, a faulty release of the mechanical sensor which, according the prior art, would already be functional after mounting, is prevented because, according to the inventive control mechanism, the release position of the control device will only be activated after using the restraining system. This means that the locking device, even when the device has been screwed to the vehicle and the integrated securing system for mounting has been canceled, the locking device, as a function of the use of the safety belt, is in a constant stand-by mode for changing between the locking position and the release position, whereby as an indicator for a required functional change a sensing device for the degree of removal of the safety belt is used. The arrangement of such a sensing device and the transmission of the corresponding sensing action into a control command for other purposes is already known, for example, from German Patent Application 41 28 230 or German Patent Application 41 32 876.

According to one embodiment of the invention, the locking device is in the form of a toothed rack that can be pivoted between its initial disengaged position and its stand-by position and is longitudinally slidable between its locking position and its release position. Thus, this design embodies a double function of the locking device, i.e., on the one hand, the securing action during mounting, whereby the actual securing action for mounting is releasable by pivoting the locking device from the initial disengaged position into the stand-by position, in which the mechanical sensor is still locked, and, on the other hand, the locking action when the safety belt reeling device has been screwed to the vehicle, i.e., upon cancellation of the securing action for mounting, depending on the use of the safety belt restraining system, which locking action secures the mechanical sensor when the safety belt is not used and releases the mechanical sensor only when the safety belt is being used.

It can be further provided that the locking device in the form of a toothed rack is pivotably supported with one end section, while the other end section in the locking position engages the mechanical sensor.

According to another embodiment of the invention, the belt sensing device comprises a drive pinion that is coupled to the drive shaft of the belt reeling device and has coordinated therewith a transmission pinion arranged on a movable bearing plate. The transmission pinion, as a function of the number of revolutions of the drive pinion resulting from the belt removal, comes into engagement with the toothing of the toothed rack and this causes a transmission of the rotation of the belt shaft onto the toothed rack. This allows in an advantageous manner that the rotational movement of the belt shaft, depending on the degree of removal, results in a longitudinal displacement of the locking device in the form of the toothed rack between its locking position and its release position.

It may be provided in an expedient manner that the toothed rack can be secured in its locking position and its release position with respective arresting means.

According to another embodiment of the invention, the control member is a spring element which is fixedly connected with one end to the housing. With the other end it biases the toothed rack in the pivoting direction whereby the spring element in the area of the housing with which the housing is connected to the vehicle is provided with a bent portion to be loaded by the screwing means so that a respective travel for the spring element in the direction of pivoting of the locking device is ensured.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
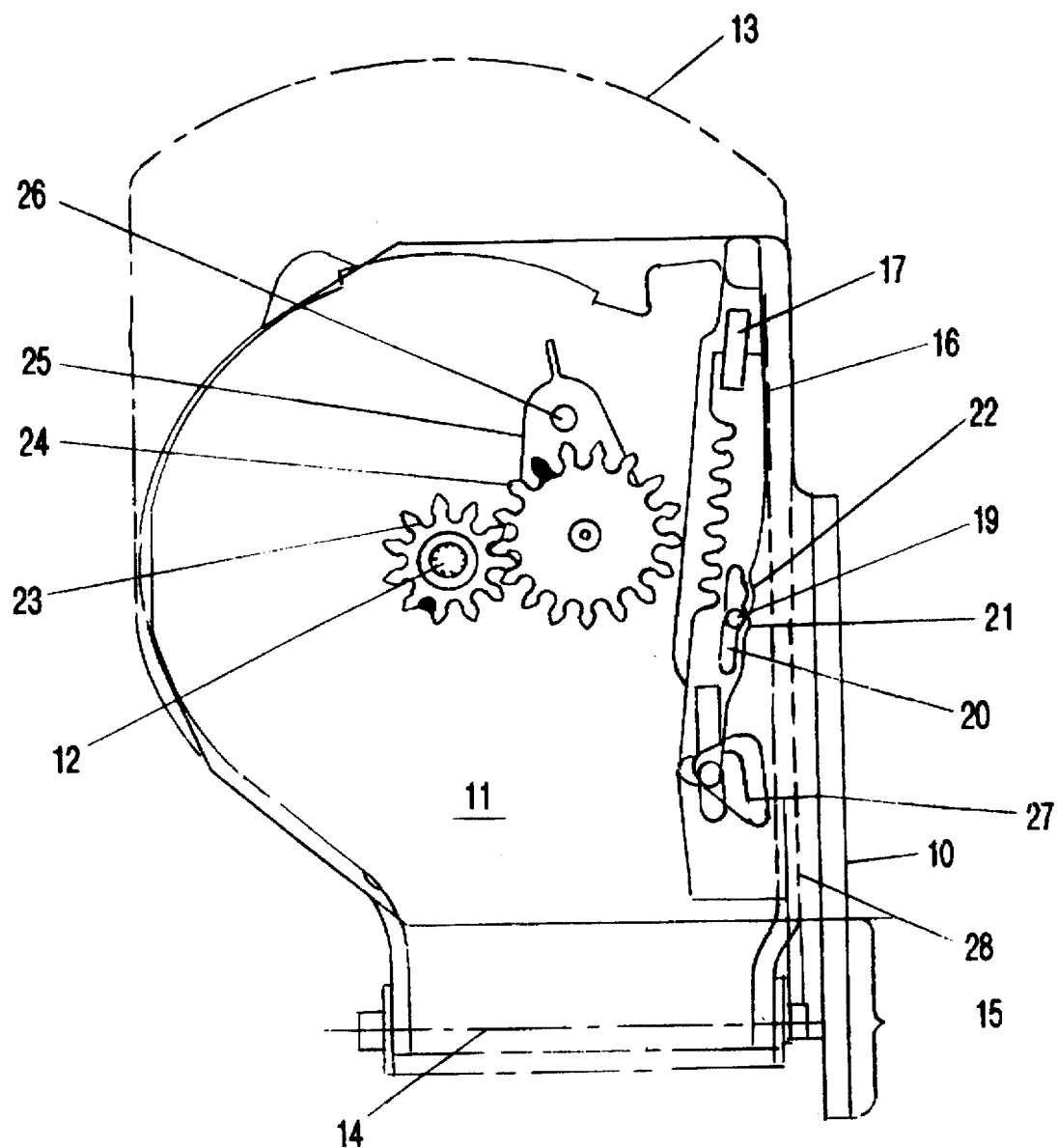
FIG. 1 shows a safety belt reeling device with control mechanism with activated securing action for mounting.

The present invention will now be described in detail with the aid of several specific embodiments utilizing FIGS. 1 through 4.

In FIGS. 1 through 4 identical parts are identified with identical reference numerals. The safety belt reeling device, as a support for the mechanical sensor in the form of a sensor mass 13, has a substantially U-shaped housing 10 with legs. The drawings show a side view of the leg 11 of the housing 10 supporting the control mechanism. The safety belt housing 10 is connected with its screwing area 15 with a non-represented screwing means to a non-represented part of the vehicle.

In the two legs 11 of the safety belt housing 10 a belt reeling shaft 12 is supported. The housing 10 supports furthermore a mechanical sensor or sensor mass 13 which is positioned upright and is pivotable about a pivot axis 14 provided at the safety belt housing 10. The sensor mass 13 is employed for releasing corresponding systems of the safety belt restraining mechanism.

Figure 2:
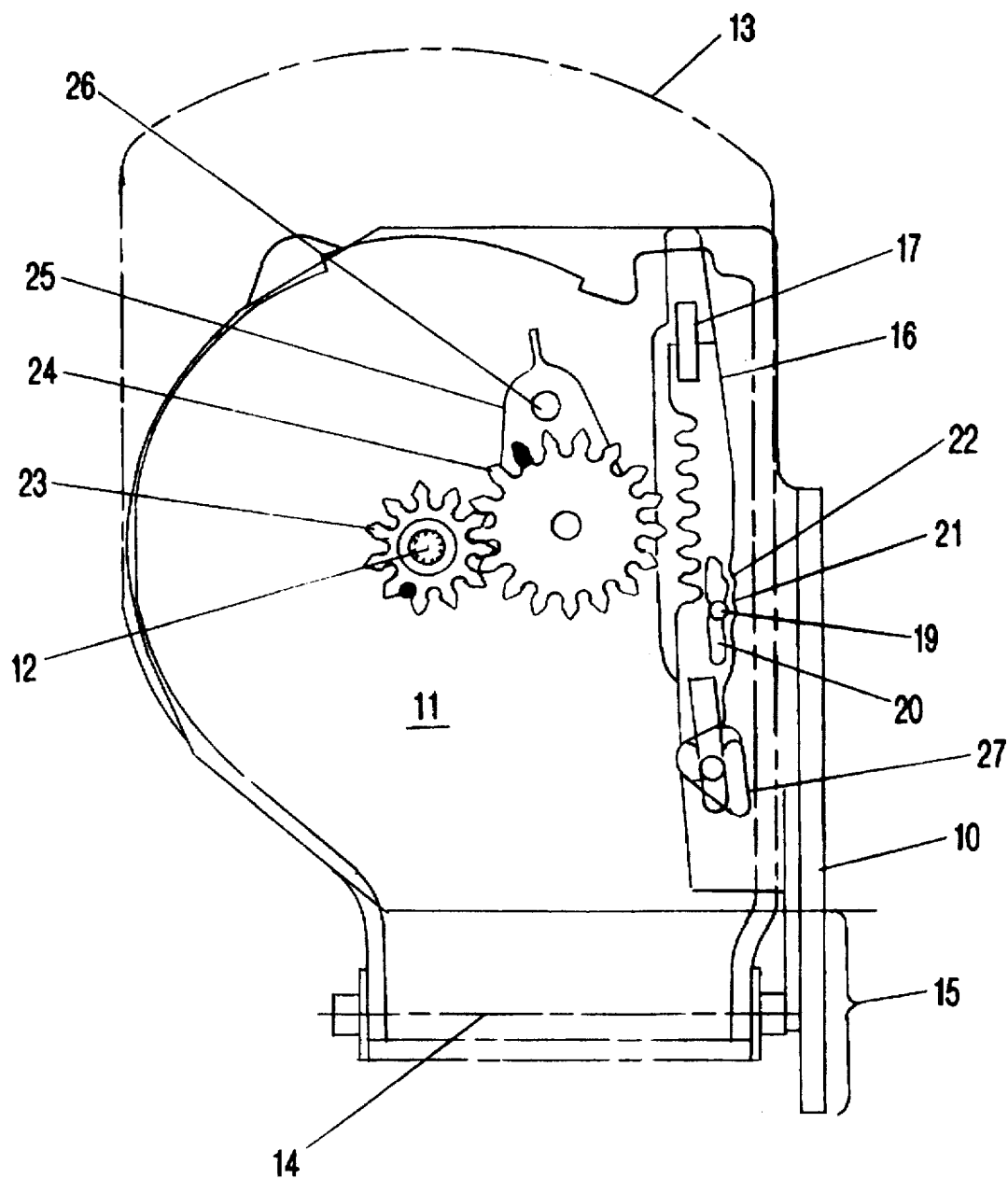
FIG. 2 shows the device according to FIG. 1 in a stand-by position of the locking device.
Figure 3:
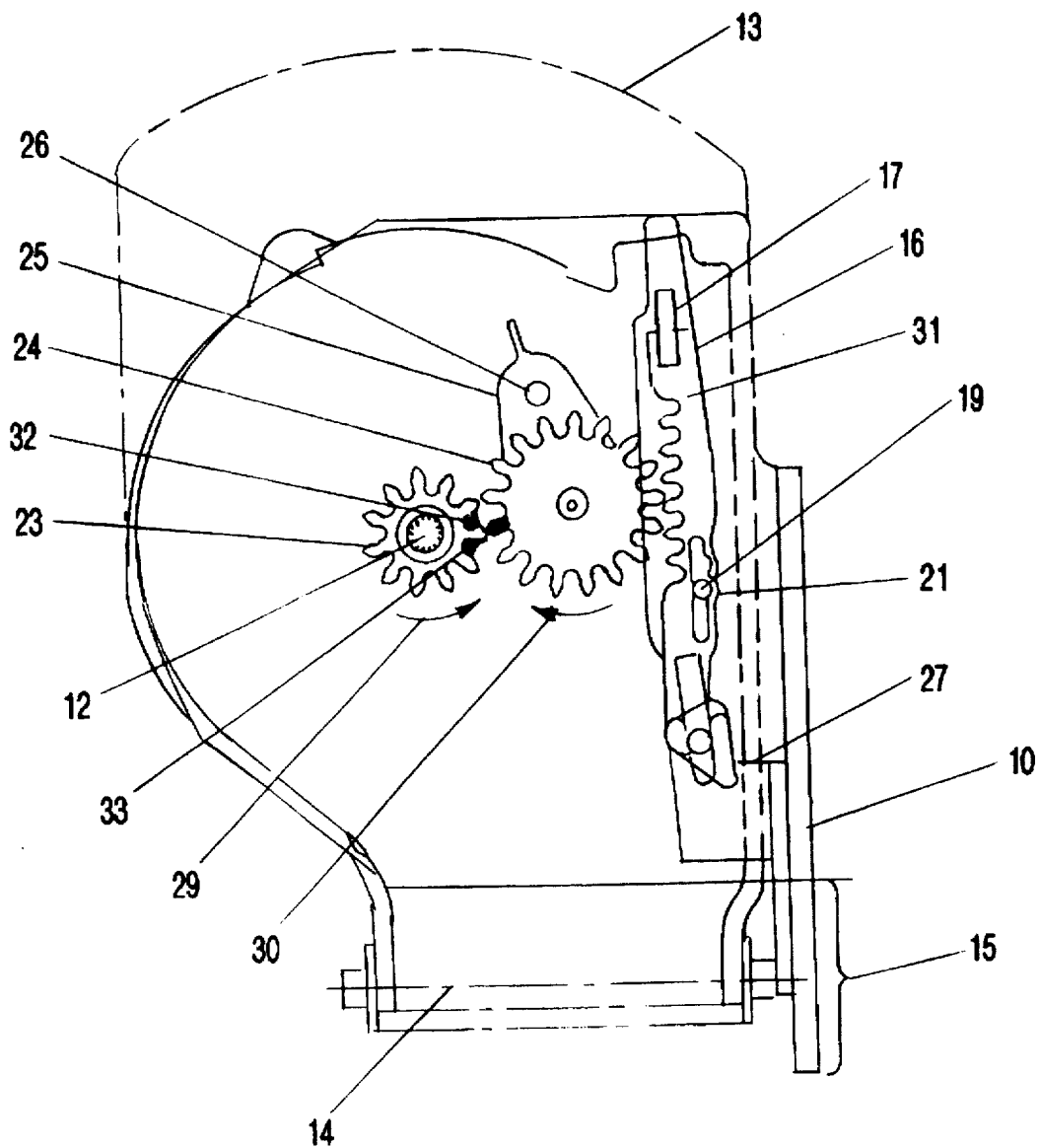
FIG. 3 shows the device according to FIG. 2 at the point of switching the locking device.
Figure 4:
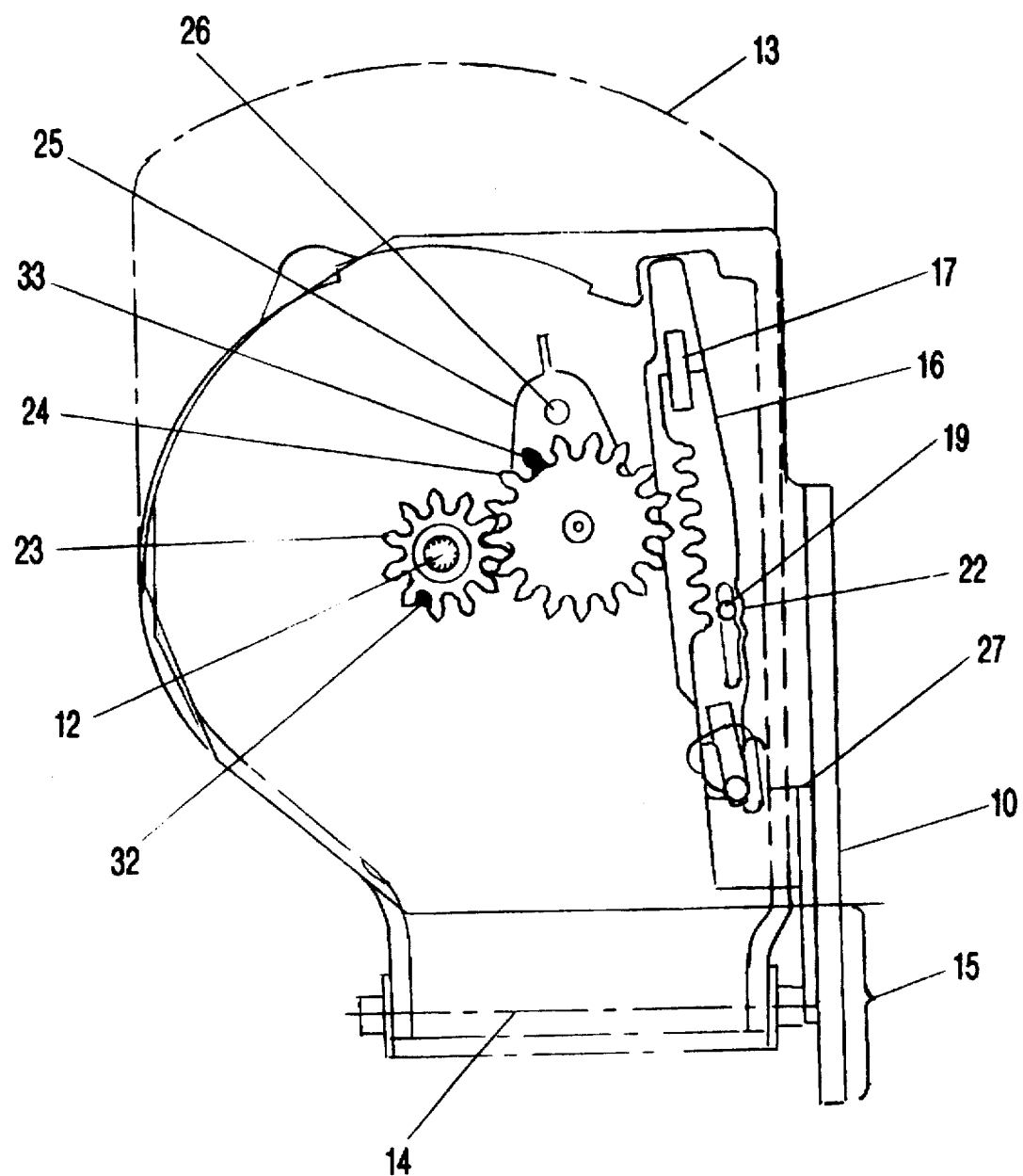
FIG. 4 shows the device according to FIG. 3 in the release position of the locking device.

As a locking device for securing the sensor mass 13 a toothed rack 16 is provided which, in the locking position represented in FIGS. 1 to 3, engages with a locking nose 17 the sensor mass 13 in order to secure it in its upright position. The toothed rack 16 is pivotably supported with its end opposite the locking nose 17 at a bearing pin 19 of the safety belt housing 10. The pivot bearing pin 19 simultaneously provides for a longitudinal displacement of the toothed rack 16 in that the toothed rack 16 is seated with a longitudinal slot 20 on the bearing pin 19. The two positions with respect to the longitudinal displacement of the toothed rack 16 for the locking position, on the one hand, and the release position, on the other hand, are defined by arresting means 21, 22 in the form of recesses arranged at the edge of the longitudinal slot 20 that extends about the bearing pin 19. The arresting means 21 corresponds to the locking position and the arresting means 22 corresponds to the release position.

For coupling the displacement of the toothed rack 16 to the belt sensing device, a drive pinion 23 is fastened on the shaft 12. The drive pinion 23 has coordinated therewith a transmission pinion 24 supported on a bearing plate 25 pivotably connected to a pivot pin 26 at the housing. The pivot range of the bearing plate 25 is such that the transmission pinion 24 in a defined position engages the drive pinion 23 as well as the toothing of the toothed rack 16. The bearing plate 25 is spring-loaded (not represented) in the direction toward the drive pinion 23. As a control member for the locking device, embodied as a toothed rack 16, a spring element 27, arranged in the screwing area 15 of the housing 10, is fixedly connected to the safety belt housing 10. The spring element 27 rests with its free end on the toothed rack 16. In the screwing area 15 the spring element 27 has a bent portion 28 such that, upon screwing the safety belt housing 10 to the fixed part of the vehicle, the resulting pressure onto the bent portion 28 of the spring element 27 causes the toothed rack 16 to pivot about bearing pin 19 in the counter clockwise direction.

In the position represented in FIG. 1 the securing action for mounting is realized via the control member in the form of the spring element 27 such that the toothed rack 16 is disengaged from the transmission pinion 24 so that a removal of the belt does not result in a movement of the toothed rack 16. The toothed rack 16 is in a position in which its locking nose 17 secures the sensor mass 13.

In the functional position represented in FIG. 2 the securing action for mounting is canceled since, due to screwing of the belt housing 10 to the vehicle, the spring element 27 is loaded and rotates with its free end the toothed rack 16 into the stand-by position in which, however, the toothed rack 16 is still in its locking position for securing the sensor mass 13. In this position, with the safety belt retracted, the transmission pinion 24 does not engage the toothing of the toothed rack 16 so that in this stand-by position the sensor mass 13 is still secured.

When now, upon using the safety belt restraining system, the safety belt is removed from the safety belt shaft 12, the resulting rotation of the drive pinion 23 in the direction of arrow 29 results in a rotation of the transmission pinion 24 in the direction of arrow 30 due to the meshing toothings. At a certain relative position of drive pinion 23 and transmission pinion 24, in which switching cams 32, 33 of the pinions 23, 24 meet, a counterclockwise rotation of the bearing plate 25 about the housing-fixed pivot pin 26 takes place, and the transmission pinion 24 supported on the bearing plate 25 thus also meshes with the toothed rack 16. Upon further rotation of the belt shaft 12 the toothed rack 16 is now also moved by the transmission pinion 24 in the longitudinal direction of arrow 31. Due to this longitudinal displacement the locking nose 17 releases the sensor mass 13 so that with the toothed rack 16, displaced in the downward direction, the sensor mass 13 is now functional. The corresponding arresting means 21, 22 ensure that the respective positions of the toothed rack 16 for the locking position and for the release position are defined. When now the safety belt is taken off by the user and the safety belt is retracted onto the shaft 12, the direction of rotation of the drive pinion 23 and of the transmission pinion 24 is reversed so that the toothed rack 16 is again longitudinally displaced into the position in which the sensor mass 13 is secured. In this manner, the sensor mass 13 is again secured while the safety belt is not in use and faulty releases of the sensor mass 13 are prevented.

When the safety belt housing 10 is removed from the vehicle part, the loading action of the screwing means onto the bent portion 28 of the spring element 27 is canceled so that the spring element 27 is returned and a pivoting of the toothed rack 16 into the initial disengaged position (FIG. 1) results.

The features of the inventive object of this application, as disclosed in the above description, the claim, the abstract, and the drawing, may be important individually as well as in any desired combination for the realization of the invention in its various embodiments.

What we claim is:

1. A control mechanism for a mechanical sensor for a safety belt reeling device of a safety belt restraining mechanism of a vehicle, said control mechanism comprising:

a housing;

a mechanical sensor pivotably connected to said housing;

a locking device connected to said housing, wherein said locking device has a locking position for securing said mechanical sensor against pivoting and a release position for releasing said mechanical sensor, wherein said locking device further has an initial disengaged position before mounting of said housing to the vehicle and a stand-by position in which said locking device remains in said locking position relative to said mechanical sensor;

a sensing device for sensing belt removal from the safety belt reeling device and for cooperating with said locking device in said stand-by position such that, at a certain degree of belt removal, said sensing device moves said locking device from said locking position into said release position; and a control member for controlling said locking device, said control member having an inactive position and an active position, wherein said control member is moved from said inactive position into said active position when said housing is fastened to the vehicle, wherein in said inactive position said locking device is forced by said control member into said initial disengaged position and wherein, when said control member is moved into said active position, said locking device is moved into said standby position.

2. A control mechanism according to claim 1, wherein said locking device is a toothed rack connected to said housing so as to be pivotable between said initial disengaged position and said stand-by position and so as to be longitudinally slidable between said locking position and said release position.

3. A control mechanism according to claim 2, wherein said toothed rack has a first end section and a second end section, wherein said first end section is pivotably connected to said housing and said second end section engages said mechanical sensor in said locking position.

4. A control mechanism according to claim 2, wherein said control member is a spring element having a first end fixedly connected to said housing and a second end for biasing said toothed rack in a direction of pivoting into said stand-by position.

5. A control mechanism according to claim 4, wherein said spring element has a bent portion in an area of said housing with which said housing is connected to the vehicle.

6. A control mechanism according to claim 2, wherein said sensing device comprises a drive pinion connected to a shaft of the safety belt reeling device, a bearing plate movably connected to said housing, and a transmission pinion connected to said bearing plate, wherein said drive pinion meshes with said transmission pinion, wherein the certain degree of belt removal is defined by a certain number of revolutions of said drive pinion, and wherein, when said certain number of revolutions has been reached, said transmission pinion engages said toothed rack to thereby transmit the rotation of the shaft onto said toothed rack.

7. A control mechanism according to claim 2, wherein said toothed rack comprises means for arresting said toothed rack in said locking position and said release position.

* * * * *